United States Patent
Santhiveeran et al.

(10) Patent No.: US 9,584,523 B2
(45) Date of Patent: Feb. 28, 2017

(54) VIRTUAL PRIVATE NETWORK ACCESS CONTROL

(71) Applicant: HEWLETT-PACKARD DEVELOPMENT COMPANY, L.P., Houston, TX (US)

(72) Inventors: Soma Sundaram Santhiveeran, Fremont, CA (US); Jose Paulo Xavier Pires, Porto Alegre (BR); Ricardo Bueno Moreira, Porto Alegre (BR); Humberto Cardoso Marchezi, Porto Alegre (BR); Paul Gerhard Schulze, Porto Alegre (BR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 252 days.

(21) Appl. No.: 13/664,211

(22) Filed: Oct. 30, 2012

(65) Prior Publication Data
US 2014/0122716 A1   May 1, 2014

(51) Int. Cl.
*H04L 29/06* (2006.01)
*G06F 15/173* (2006.01)
*G06F 15/16* (2006.01)

(52) U.S. Cl.
CPC ......... *H04L 63/102* (2013.01); *H04L 63/0272* (2013.01); *H04L 63/02* (2013.01)

(58) Field of Classification Search
CPC .............. G06F 15/16; H04L 12/4641; H04L 2012/5621; H04L 63/20; H04L 67/2804; H04L 63/102; H04L 63/0272; H04L 63/02
USPC ....... 709/225, 229, 223; 726/15, 4; 713/153, 713/168, 183
See application file for complete search history.

(56) References Cited

U.S. PATENT DOCUMENTS

| | | | |
|---|---|---|---|
| 7,124,101 B1 | 10/2006 | Mikurak | |
| 7,356,027 B1 * | 4/2008 | Parekh et al. | 370/389 |
| 7,568,220 B2 * | 7/2009 | Burshan | 726/4 |
| 7,624,429 B2 * | 11/2009 | Van Ackere et al. | 726/3 |
| 7,657,735 B2 * | 2/2010 | Amoroso et al. | 713/150 |

(Continued)

OTHER PUBLICATIONS

"Check Point Secure Access," Nomasis. <http://www.nomasis.ch/en/products/client-security/endpoint-security/secure-access.html>, downloaded Oct. 30, 2012.

*Primary Examiner* — David Lazaro
*Assistant Examiner* — Zi Ye
(74) *Attorney, Agent, or Firm* — Hewlett Packard Enterprise Patent Department (57) ABSTRACT

According to an example, a method for virtual private network (VPN) access control includes receiving a request from an application on a user device to access a remote computer network asset, and determining, by a processor, an authorization of the application to access the remote computer network asset based on a policy. In response to a determination that the application is authorized to access the remote computer network asset, the method includes setting a VPN connection between the user device and a remote computer network including the remote computer network asset, and routing traffic from the application to the remote computer network asset via the VPN. In response to a determination that the application is not authorized to access the remote computer network asset, the method includes routing traffic from the application to a network different than the remote computer network.

19 Claims, 5 Drawing Sheets

(56) References Cited

U.S. PATENT DOCUMENTS

| | | |
|---|---|---|
| 8,146,145 B2 | 3/2012 | Hyndman et al. |
| 8,276,184 B2 * | 9/2012 | Canning et al. ............... 726/1 |
| 8,560,709 B1 * | 10/2013 | Shokhor et al. ............ 709/229 |
| 2003/0217150 A1 * | 11/2003 | Roese et al. ................. 709/225 |
| 2006/0112174 A1 * | 5/2006 | L'Heureux et al. ......... 709/223 |
| 2007/0186106 A1 * | 8/2007 | Ting et al. ................... 713/168 |
| 2008/0034419 A1 * | 2/2008 | Mullick et al. ................ 726/15 |
| 2011/0162062 A1 | 6/2011 | Kumar et al. |
| 2011/0321150 A1 | 12/2011 | Gluck et al. |
| 2012/0054744 A1 | 3/2012 | Singh et al. |
| 2013/0166918 A1 * | 6/2013 | Shahbazi et al. ............ 713/183 |
| 2014/0096229 A1 * | 4/2014 | Burns et al. .................. 726/15 |

* cited by examiner

VIRTUAL PRIVATE NETWORK ACCESS CONTROL

BACKGROUND

A virtual private network (VPN) typically uses the Internet or another intermediate network to connect a user's computer, for example, at a remote location, to remote computer networks. For example, a user may use a VPN to connect to their enterprise network from home and access their emails, files, etc., and other enterprise assets, such as printers, databases, etc. The operation of VPNs often present security risks to enterprise networks and assets.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The operation of VPNs can present security risks to enterprise networks and assets. For example, applications on remote devices (e.g., a user's computer at a remote location) can connect to Internet protocol (IP) addresses accessible via the VPN. This can allow unauthorized applications on the remote devices, including those downloaded from the Internet, to access VPN assets (e.g., enterprise assets accessible via the VPN), thus increasing security risks.

For example, a VPN may be used to connect a client-side application on a user's device at a remote location to server-side applications inside an enterprise firewall. Examples of applications on the user device may include HTML and HTML5 applications that run inside a web-browser, legacy applications, applications that run inside a virtual machine (VM), etc. Once a VPN connection is set up, information technology (IT) assets inside an enterprise firewall may be accessed by all applications running on the user device, which includes applications authorized by the enterprise, as well as applications that are downloaded from the public Internet. This can allow a malicious application downloaded from the public Internet or accessed through a browser to connect to enterprise assets inside the enterprise firewall, exposing such assets to a variety of security risks.

According to an example, a VPN asset control system and a method for VPN asset control are described, and generally provide for control of access to a VPN, and thus to enterprise assets. For example, enterprise IT administrators may control access to a VPN based on the specifications of a requesting application and IT policies. The VPN asset control system and the method for VPN asset control provide for access control of applications, regardless of the type of application. For example, access control may be provided for applications such as HTML and HTML5 applications, legacy applications, applications that run inside a VM, etc. This can provide for granular control over which application on a user's device can access what specific assets within a VPN.

Figure 1:
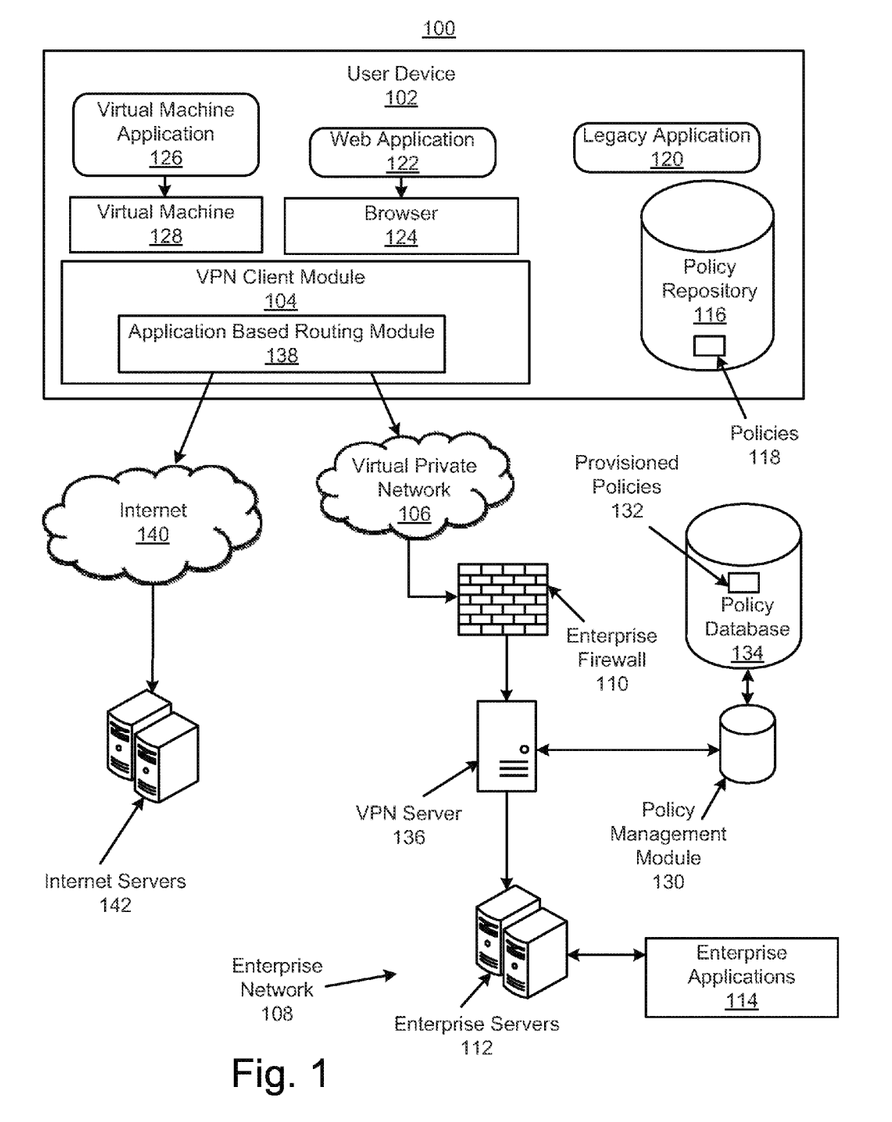
FIG. 1 illustrates an architecture of a virtual private network (VPN) access control system, according to an example of the present disclosure.

FIG. 1 illustrates an architecture of a VPN asset control system 100, according to an example. Referring to FIG. 1, the system 100 is depicted as including a user device 102 that includes a VPN client module 104 to set up a secure VPN 106 to an enterprise network 108 behind an enterprise firewall 110. The enterprise firewall 110 may limit access to enterprise network assets, such as enterprise servers 112, enterprise applications 114, databases, etc. The user device 102 may include a policy repository 116 to store policies 118 for access restrictions on a per application basis for applications that are executed on the user device 102. For example, the user device 102 may include legacy applications 120 that are executed natively, web applications 122 that are executed inside a browser 124, and virtual machine (VM) applications 126 (e.g., applications written using JAVA, RUBY, etc.) that are executed inside a VM 128. The system 100 may further include a policy management module 130 that is to allow enterprise IT administrators to provision and manage access restrictions to enterprise network assets on a per application basis, for example, for the applications 120, 122, and 126. The policy management module 130 may store provisioned policies 132 in a policy database 134. A VPN server 136 is to tunnel IP packets from the VPN client module 104 on the user device 102 to the enterprise servers 112. The VPN client module 104 may include an application based routing module 138 to selectively limit access to IT assets exposed via the VPN 106 to authorized applications by selectively routing traffic (e.g., packets) to the VPN 106, or to the Internet 140 for execution on internet servers 142.

The modules 104, 130, and 138, and other components of the system 100 that perform various other functions in the system 100, may comprise machine readable instructions stored on multiple computer readable medium. In addition, or alternatively, the modules 104, 130, and 138, and other components of the system 100 may comprise hardware or a combination of machine readable instructions and hardware.

The user device 102 may be any type of device, such as a desktop, laptop, tablet, etc., that a user may use, for example, to set up a remote connection to the enterprise network 108. For example, the user device 102 may include the VPN client module 104 to set up the secure VPN 106 to the enterprise network 108 behind the enterprise firewall 110.

The user device 102 may include a variety of applications thereon, such as the legacy applications 120, the web applications 122, the virtual machine (VM) applications 126, etc. At any given time, a user of the user device 102 may simultaneously use a variety of applications that include personal applications and applications to access assets of the enterprise network 108. Such personal applications may attempt to access VPN assets (e.g., assets of the enterprise network 108 that are accessible by the VPN 106), thus increasing security risks. For example, once the VPN 106 is established, the VPN 106 may tunnel data from the user device 102 to the enterprise network 108 for any personal applications, as well as for any applications that are authorized to access assets of the enterprise network 108. The tunnel established by the VPN 106 may allow an unauthorized application to penetrate the enterprise network 108. For example, for personal applications that are not authorized to access the enterprise network 108, the tunnel established by the VPN 106 may allow such personal applications to penetrate the enterprise network 108.

In order to manage such unauthorized access, the policy repository 116 may store policies 118 for access restrictions on a per application basis for applications that are executed on the user device 102. The policies 118 may include a list of authorized applications that may include one or more of the legacy applications 120 that are executed natively, the web applications 122 that are executed inside the browser 124, and the VM applications 126 that are executed inside the virtual machine 128. For each authorized application, the policy repository 116 may include a list of VPN assets the application may access. For example, for each authorized application, the policy repository 116 may include a list of enterprise network assets, such as the enterprise servers 112, the enterprise applications 114, etc., the application may access. Therefore, applications that are not listed in the policies 118, or otherwise denoted as authorized applications, may be denied access to the enterprise network 108 via the VPN 106.

If an application is not authorized to access the enterprise network 108, instead of routing traffic (e.g., packets) from the application to the VPN 106, the application based routing module 138 may selectively route traffic to a network different than the enterprise network 108, which in the example shown includes routing to one of the internet servers 142 via the Internet 140. For example, any personal applications on the user device 102 that are not authorized to access the enterprise network 108 may be selectively routed to the Internet 140 for execution on the internet servers 142. Likewise, any enterprise applications on the user device 102 that are not authorized to access the enterprise network 108, or any enterprise applications on the user device 102 that are not authorized to access a specific enterprise asset, may be selectively routed to the Internet 140 for execution on the internet servers 142. Routing traffic to the Internet allows the requesting application to perform functions, which may be personal to the user of the user device 102, without breaching the enterprise network 108 via the VPN 106.

For setup of the user device 102, the user device 102 may initially include a policy 118 to authorize access to the policy management module 130 of the enterprise network 108, and prevent access to any other assets of the enterprise network 108. Once a user initiates execution of the VPN client module 102, based on the policies specific to the user device 102, the policy management module 130 may determine and store the provisioned policies 132 that are specific to the user device 102 in the policy database 134. The policies specific to the user device 102 may be determined based, for example, on specifics of the position of a user of the user device 102 within an enterprise (e.g., the enterprise including the enterprise network 108). For example, the policies specific to the user device 102 may be determined based on whether the user of the user device 102 is in a particular department, or at a particular position within an enterprise. The policies specific to the user device 102 may also be determined based on the capabilities of the applications on the user device 102 and/or the capabilities of the user device 102 for accessing assets of an enterprise. Once the provisioned policies 132 that are specific to the user device 102 are determined, the policies 118 of the policy repository 116 of the user device 102 may be updated, for example, to include the provisioned policies 132 specific to the user device 102. Thus, further attempts by the applications on the user device 102, such as the applications 120, 122, and 126, to access the assets of the enterprise network 108 may be controlled by the VPN client module 104 based on the policies 118.

For the policies 118 of the policy repository 116, each authorized application may be identified using a predefined identification (ID). Further, each of the VPN assets (i.e., the enterprise network assets) may be identified, for example, by a uniform resource locator (URL), IP address, an IP address and IP port pair, etc. The application ID may be hashed or encrypted, for example, to prevent spoofing. If a non-hashed application ID is used, the application ID may be accompanied by a set of authentication credentials (e.g., a hashed password). The application ID may be a unique ID that is used by the policy management module 130, and thus by the policies 118 to identify the application. Therefore, any personal or otherwise malicious applications on the user device 102 that do not have an application ID that may be identified by the policies 118 are denied access to the enterprise network 108 and routed to the Internet 140 for execution on the internet servers 142.

Figure 2:
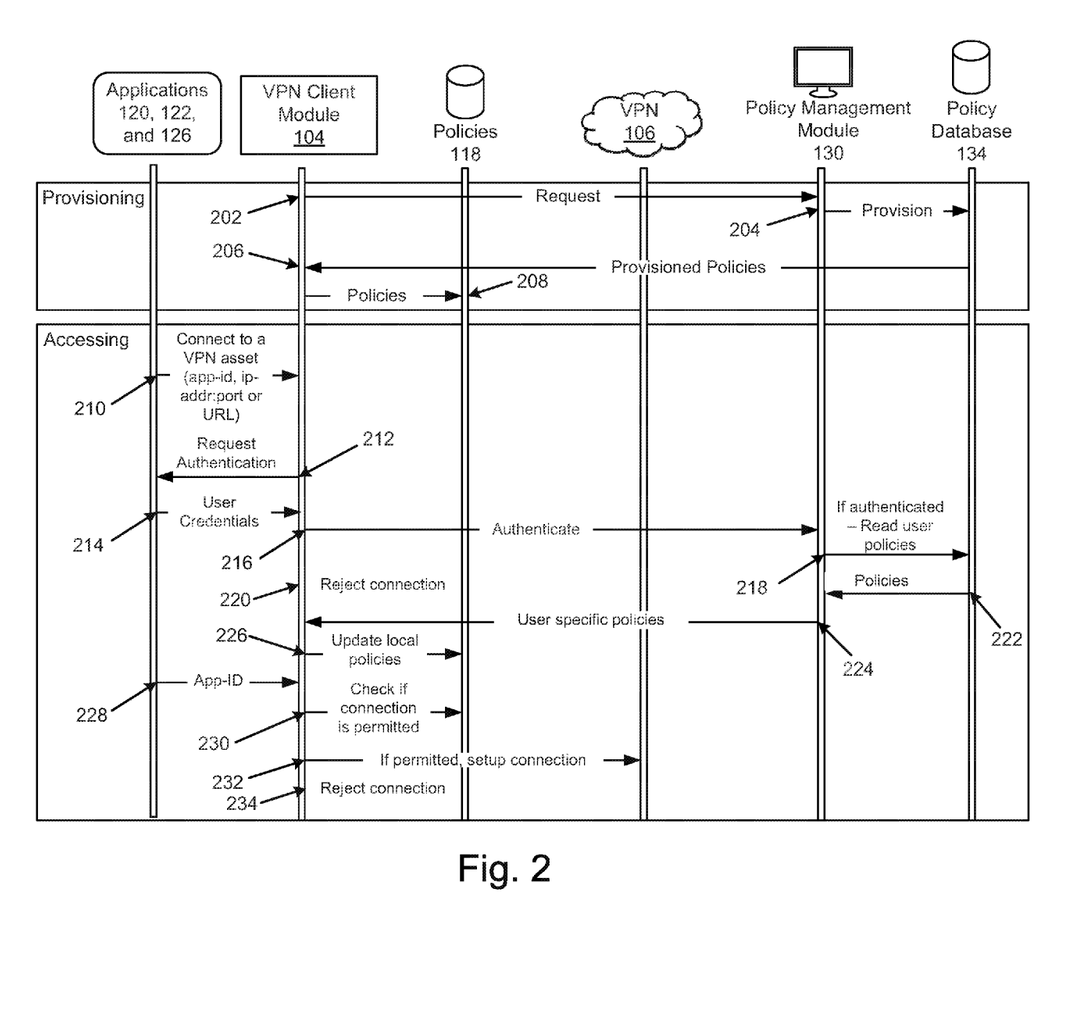
FIG. 2 illustrates a flowchart for VPN access control, according to an example of the present disclosure.

FIG. 2 illustrates a flowchart 200 for VPN access control, according to an example of the present disclosure. Referring to FIGS. 1 and 2, in order to provision and manage access restrictions for the applications (e.g., applications 120, 122, and 126) on the user device 102, at 202, a request to provision is sent from the VPN client module 104 on the user device 102 to the policy management module 130. Based on the specifics of the user device 102 (e.g., the specifics of the position of a user of the user device 102 within the enterprise network 108), at 204, the policy management module 130 creates a list of authorized applications. For example, an IT administrator may use the policy management module 130 to create a list of authorized applications. For each authorized application, the policy management module 130 may be used to further define whether the application on the specific user device 102 may access the VPN assets. If an application is allowed to access VPN assets, VPN assets that the application may access are provisioned, and the provisioned policies 132 may be stored in the policy database 134. At 206, based on the provisioned policies 132, data specific to each application and user device 102 is delivered to authorized user devices. At 208, the data received at 206 is stored as the policies 118 in the policy repository 116 of the user device 102.

In order for an application on the user device 102 to connect to a VPN asset, for example, by connecting to a URL, IP address, an IP address and IP port pair, etc., of a VPN asset, at 210, an application attempts to connect to a VPN asset. At 212, the VPN client module 104 intercepts the connection request, requests the application to authenticate itself, and determines credentials of the user of the user device 102. The user credentials are determined, for example, to determine a user's current role in an enterprise. For example, a user's current role in an enterprise may determine which assets of the enterprise network 108 the user has access to. For example, based on a user's current role, access to certain assets of the enterprise network 108 may be added, modified, or removed, compared to the user's previous role. At 214, the user's credentials are received by the VPN client module 104. At 216, the user's credentials are authenticated by the policy management module 130. At 218, if the user credentials are determined to be authentic, policies specific to the user are read by the policy management module 130 from the policy database 134. If the user credentials are determined to be unauthentic, at 220, the VPN client module 104 rejects the VPN connection request. At 222, if the user credentials are determined to be authentic at 218, the policies that are specific to the user are returned to the policy management module 130. At 224, the policies that are specific to the user are forwarded to the VPN client module 104. At 226, the policies that are specific to the user are stored as the policies 118 in the policy repository 116 of the user device 102. Thus, at 226, the policies 118 in the policy repository 116 are updated based on the user credentials. At 228, the application provides an application ID for authentication. The application ID may be hashed or encrypted, for example, to prevent spoofing. If a non-hashed application ID is used, the application ID may be accompanied by a set of authentication credentials (e.g., a hashed password). Based on the application ID, the VPN client module 104 determines whether the application ID is authentic. For example, at 230, using the policy data in the policies 118, the VPN client module 104 determines if the application is permitted to access the requested VPN asset. If the application is permitted to access the requested VPN asset, at 232, the VPN client module 104 initiates the VPN connection to permit the application to connect to the requested VPN asset. Otherwise, if the application is not permitted to access the requested VPN asset, at 234, the VPN client module 104 rejects the VPN connection request. For example, if the application is not permitted to access the requested VPN asset, the application based routing module 138 may selectively route traffic (e.g., packets) for the application to the Internet 140 for execution on the internet servers 142.

Figure 3:
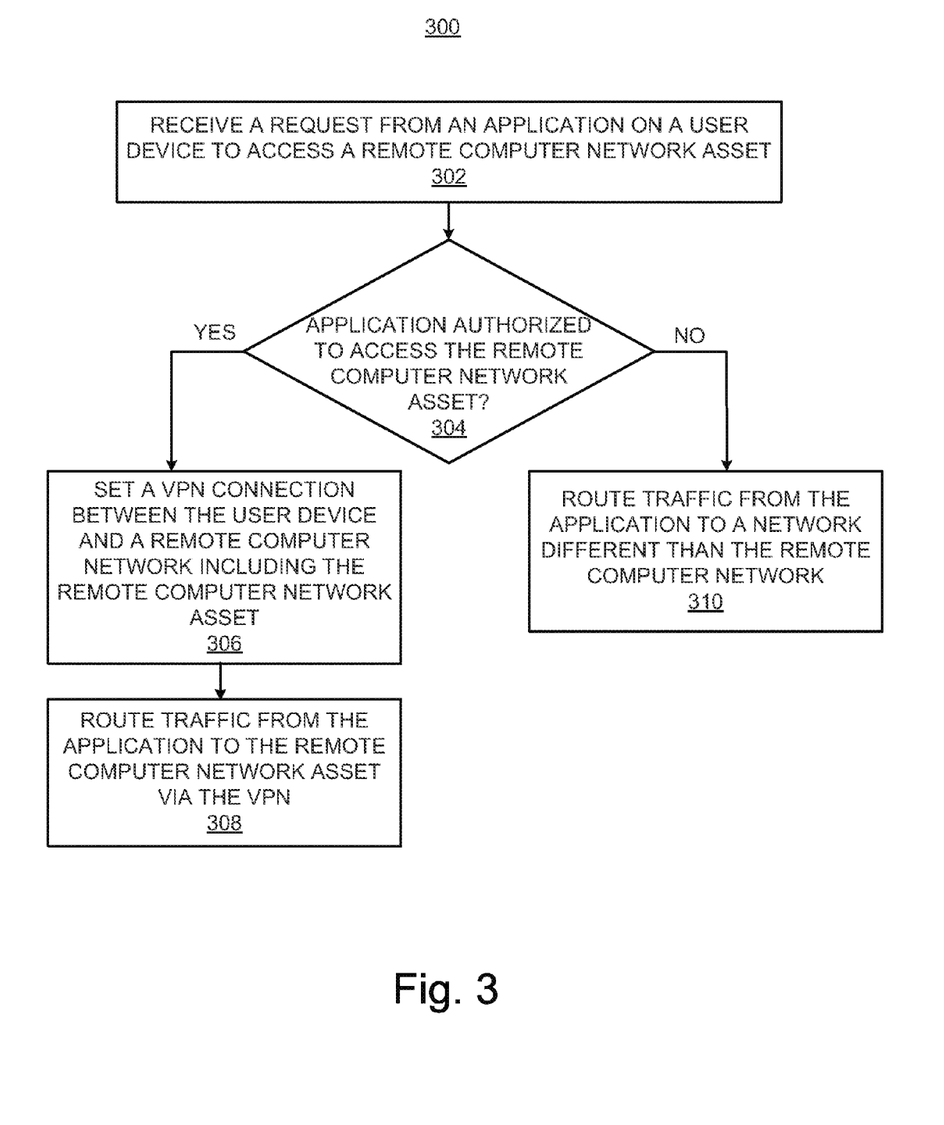
FIG. 3 illustrates a method for VPN access control, according to an example of the present disclosure.
Figure 4:
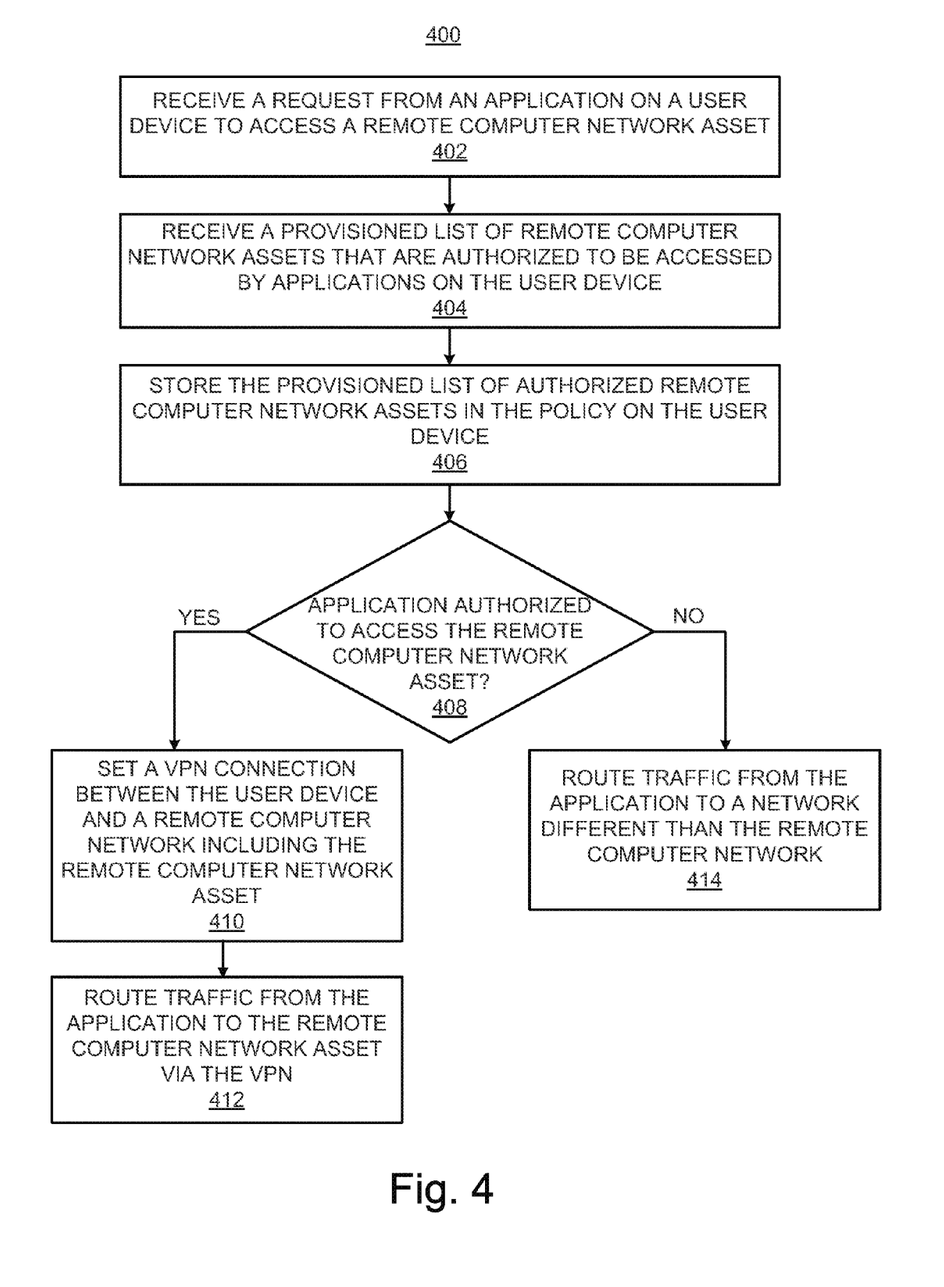
FIG. 4 illustrates further details of the method for VPN access control, according to an example of the present disclosure.

FIGS. 3 and 4 illustrate flowcharts of methods 300 and 400 for VPN access control, corresponding to the example of the VPN asset control system 100 whose construction is described in detail above. The methods 300 and 400 may be implemented on the VPN asset control system 100 with reference to FIG. 1 by way of example and not limitation. The methods 300 and 400 may be practiced in other systems.

Referring to FIG. 3, for the method 300, at block 302, a request is received from an application on a user device to access a remote computer network asset. For example, referring to FIG. 1, a request is received from an application (e.g., an application 120, 122, or 126) on the user device 102 to access a remote computer network asset (e.g., an asset of enterprise network 108).

At block 304, an authorization of the application to access the remote computer network asset is determined based on a policy. For example, referring to FIG. 1, the VPN client module 104 determines an authorization of the application to access the remote computer network asset (e.g., an asset of enterprise network 108) based on a policy 118 of the policy repository 116.

At block 306, in response to a determination that the application is authorized to access the remote computer network asset, a VPN connection is set between the user device and a remote computer network including the remote computer network asset, and at block 308, traffic is routed from the application to the remote computer network asset via the VPN. For example, referring to FIG. 1, if the application is authorized to access the remote computer network asset, the VPN 106 is set by the VPN client module 104 between the user device 102 and the enterprise network 108 including an enterprise network asset, and traffic is routed by the application based routing module 138 from the application (e.g., an application 120, 122, or 126) to the remote computer network asset via the VPN 106.

At block 310, in response to a determination that the application is not authorized to access the remote computer network asset, traffic is routed from the application to a network different than the remote computer network. For example, if the application is not authorized to access the remote computer network asset, the method includes routing traffic from the application to an internet server via Internet. For example, referring to FIG. 1, if the application (e.g., an application 120, 122, or 126) is not authorized to access the remote computer network asset, traffic is routed by the application based routing module 138 from the application to a network different than the enterprise network 108, which in the example shown includes routing to one of the internet servers 142 via the Internet 140.

Referring to FIG. 4, for the method 400, at block 402, a request is received from an application on a user device to access a remote computer network asset.

At block 404, a provisioned list of remote computer network assets that are authorized to be accessed by applications on the user device is received. For example, referring to FIG. 1, a provisioned list (e.g., the provisioned policies 132 for the user device 102) of remote computer network assets (e.g., an asset of enterprise network 108) that are authorized to be accessed by applications on the user device 102 is received by the user device 102.

At block 406, the provisioned list of authorized remote computer network assets is stored in the policy on the user device. For example, referring to FIG. 1, the provisioned list (i.e., provisioned policies 132 that are specific to the user device 102) of authorized remote computer network assets is stored as one of the policies 118 on the user device 102.

At block 408, an authorization of the application to access the remote computer network asset is determined based on a policy. Determining the authorization of the application to access the remote computer network asset may include determining an authorization of the user device to access the remote computer network asset. Further, determining the authorization of the application to access the remote computer network asset may include comparing an application ID for the application to authorized application IDs for applications authorized to access the remote computer network asset, and if the application ID matches one of the authorized application IDs, indicating the application as being authentic, and if the application ID does not match one of the authorized application IDs, indicating the application as being unauthentic.

At block 410, in response to a determination that the application is authorized to access the remote computer network asset (i.e., determined to be authentic), a VPN connection is set between the user device and a remote computer network including the remote computer network asset, and at block 412, traffic is routed from the application to the remote computer network asset via the VPN.

At block 414, in response to a determination that the application is not authorized to access the remote computer network asset (i.e., determined to be unauthentic), traffic is routed from the application to an internet server via the Internet.

Figure 5:
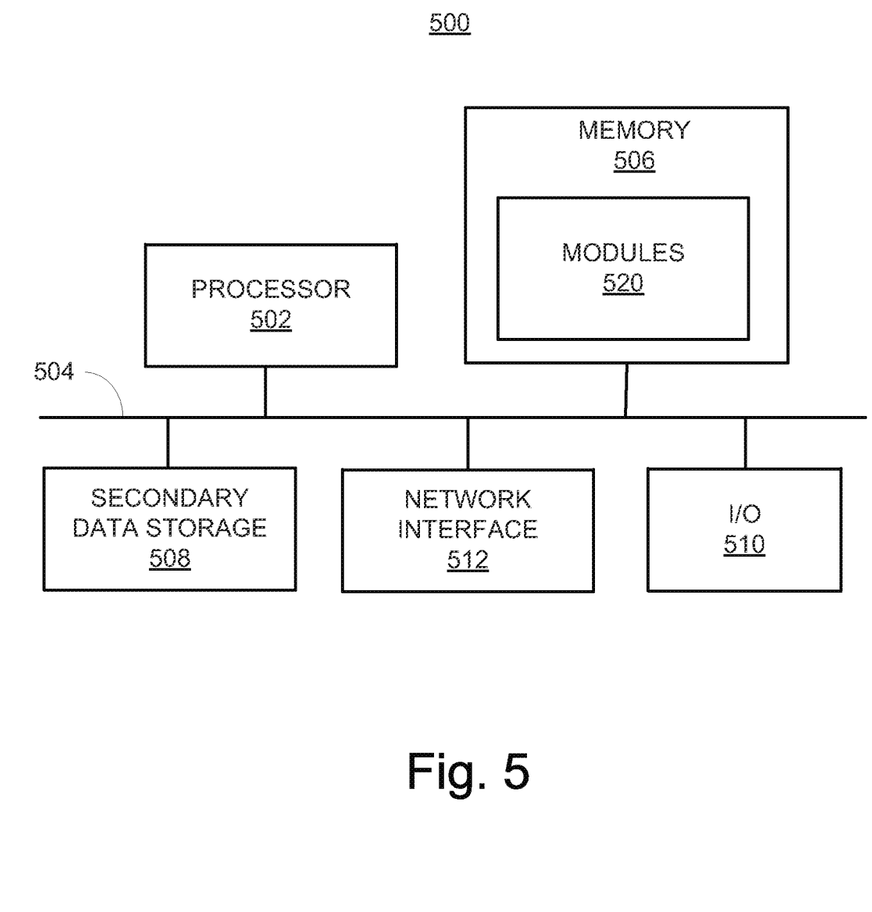
FIG. 5 illustrates a computer system, according to an example of the present disclosure.

FIG. 5 shows a computer system 500 that may be used with the examples described herein. The computer system represents a generic platform that includes components that may be in a server or another computer system. The computer system may be used as a platform for the system 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 502 that may implement or execute machine readable instructions performing some or all of the methods, functions and other processes described herein. Commands and data from the processor 502 are communicated over a communication bus 504. The computer system also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include modules 520 including machine readable instructions residing in the memory 506 during runtime and executed by the processor 502. The modules 520 may include the modules 104, 130 and 138 of the system shown in FIG. 1.

The computer system may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for virtual private network (VPN) access control, the method comprising:
   receiving a request from an application on a user device to access a remote computer network asset;
   determining, by a processor on the user device, an authorization of the application to access the remote computer network asset based on a policy;
   in response to a determination, on the user device, that the application is authorized to access the remote computer network asset:
      setting a VPN connection between the user device and a remote computer network including the remote computer network asset, and routing traffic from the application to the remote computer network asset via the VPN; and
   in response to a determination, on the user device, that the application is not authorized to access the remote computer network asset, routing traffic from the requesting application directly to a destination server different than the remote computer network asset via a network different than the remote computer network for execution of the application by the destination server, allowing the requesting application to perform functions without breaching the remote computer network.

2. The method of claim 1, wherein the application is one of a legacy application executed natively on the user device, a web application executed on a browser, and a virtual machine (VM) application executed on a VM on the user device.

3. The method of claim 1, wherein the remote computer network asset is an enterprise network asset.

4. The method of claim 1, further comprising:
   receiving a provisioned list of remote computer network assets that are authorized to be accessed by applications on the user device; and
   storing the provisioned list of authorized remote computer network assets in the policy on the user device.

5. The method of claim 1, wherein determining the authorization of the application to access the remote computer network asset further comprises:
   determining an authorization of the user device to access the remote computer network asset.

6. The method of claim 1, wherein determining the authorization of the application to access the remote computer network asset further comprises:
   comparing an application identification (ID) for the application to authorized application IDs for applications authorized to access the remote computer network asset;
   in response to the application ID matching one of the authorized application IDs, indicating the application as being authentic; and
   in response to the application ID not matching one of the authorized application IDs, indicating the application as being unauthentic.

7. The method of claim 6, wherein the application ID is hashed.

8. The method of claim 6, wherein the application ID is non-hashed and includes authentication credentials that include a hashed password.

9. The method of claim 1, wherein the policy is stored in a policy repository on the user device.

10. The method of claim 1, wherein routing traffic from the application to the destination server different than the remote computer network asset via the network different than the remote computer network further comprises:
    routing traffic from the application to the destination server that includes an internet server via Internet.

11. The method of claim 1, further comprising:
    selecting the policy based on a capability of the application.

12. The method of claim 1, further comprising:
    selecting the policy based on a capability of the user device.

13. The method of claim 1, further comprising:
    selecting the policy based on an organizational position of a user of the user device in an enterprise including the remote computer network asset.

14. The method of claim 1, further comprising:
    updating an initial version of the policy based on an authenticity of credentials of a user of the user device in an enterprise including the remote computer network asset; and
    using the updated version of the policy to determine the authorization of the application to access the remote computer network asset.

15. A user device comprising:
a memory storing machine readable instructions to:
receive a request from an application on the user device to access a remote computer network asset;
determine, on the user device, an authorization of the application to access the remote computer network asset based on a policy on the user device;
in response to a determination, on the user device, that the application is authorized to access the remote computer network asset, route traffic from the application to the remote computer network asset via a virtual private network (VPN); and
in response to a determination, on the user device, that the application is not authorized to access the remote computer network asset, route traffic from the requesting application directly to a destination server different than the remote computer network asset via Internet for execution of the application by the destination server, allowing the requesting application to perform functions without breaching the remote computer network; and
a processor to implement the machine readable instructions.

16. The user device of claim 15, further comprising machine readable instructions to:
receive a provisioned list of remote computer network assets that are authorized to be accessed by applications on the user device; and
store the provisioned list of authorized remote computer network assets in the policy on the user device.

17. The user device of claim 15, further comprising machine readable instructions to:
compare an application identification (ID) for the application to authorized application IDs for applications authorized to access the remote computer network asset;
in response to the application ID matching one of the authorized application IDs, indicate the application as being authentic; and
in response to the application ID not matching one of the authorized application IDs, indicate the application as being unauthentic.

18. A non-transitory computer readable medium having stored thereon machine readable instructions for virtual private network (VPN) access control, the machine readable instructions when executed cause a computer system to:
receive a request from an application on a user device to access a remote computer network asset;
determine, by a processor on the user device, an authorization of the user device to access the remote computer network asset based on a policy;
in response to a determination, on the user device, that the user device is authorized to access the remote computer network asset, route traffic from the application to the remote computer network asset via a VPN; and
in response to a determination, on the user device, that the user device is not authorized to access the remote computer network asset, route traffic from the requesting application directly to a destination server different than the remote computer network asset via Internet for execution of the application by the destination server, allowing the requesting application to perform functions without breaching the remote computer network.

19. The non-transitory computer readable medium of claim 18, the machine readable instructions that when executed further cause the computer system to:
compare an application identification (ID) for the application to authorized application IDs for applications authorized to access the remote computer network asset;
in response to the application ID matching one of the authorized application IDs, indicate the application as being authentic; and
in response to the application ID not matching one of the authorized application IDs, indicate the application as being unauthentic.

* * * * *